(12) United States Patent
Araújo et al.

(10) Patent No.: US 11,893,155 B2
(45) Date of Patent: Feb. 6, 2024

(54) DETERMINING A TRANSFORMATION BETWEEN COORDINATE SYSTEMS IN AN ULTRASONIC HAPTIC DEVICE AND A VISUAL SENSOR DEVICE

(71) Applicant: Telefonaktiebolaget LM Ericsson (publ), Stockholm (SE)

(72) Inventors: José Araújo, Stockholm (SE); Amirhossein Taher Kouhestani, Solna (SE); Lars Andersson, Solna (SE); Diego Gonzalez Morin, Galapagar (ES); Ioannis Karagiannis, Kalamata (GR); Ananya Muddukrishna, Enskededalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 196 days.

(21) Appl. No.: 17/442,388

(22) PCT Filed: Mar. 26, 2019

(86) PCT No.: PCT/EP2019/057596
§ 371 (c)(1),
(2) Date: Sep. 23, 2021

(87) PCT Pub. No.: WO2020/192895
PCT Pub. Date: Oct. 1, 2020

(65) Prior Publication Data
US 2022/0171462 A1 Jun. 2, 2022

(51) Int. Cl.
*G06F 3/01* (2006.01)
*G06F 3/042* (2006.01)

(52) U.S. Cl.
CPC .............. *G06F 3/016* (2013.01); *G06F 3/011* (2013.01); *G06F 3/0425* (2013.01)

(58) Field of Classification Search
CPC .......... G06F 3/016; G06F 3/011; G06F 3/017; G06F 3/0425; G10K 11/346; G01S 15/66;
(Continued)

(56) References Cited

U.S. PATENT DOCUMENTS 5,295,483 A * 3/1994 Nowacki ............ A61B 17/2256
601/4
8,316,324 B2 * 11/2012 Boillot .................. G06F 3/0481
715/862

(Continued)

FOREIGN PATENT DOCUMENTS

WO       2016038347 A1    3/2016
WO    WO-2019207143 A1 *  10/2019  ............... B06B 1/02

OTHER PUBLICATIONS

International Search Report and Written opinion dated Jun. 13, 2019 for International Application No. PCT/EP2019/057596 filed Mar. 26, 2019, consisting of 12-pages.
(Continued)

*Primary Examiner* — William Lu
(74) *Attorney, Agent, or Firm* — Christopher & Weisberg, P.A.

(57) ABSTRACT

A method for determining a transformation between a first coordinate system of an ultrasonic haptic device and a second coordinate system of a visual sensor device. The method includes: triggering generation of an ultrasonic focal point; obtaining images depicting a body part of a user while the ultrasonic focal point is active; determining a position of the ultrasonic focal point in the second coordinate system when the body part of the user is in the ultrasonic focal point; repeating the triggering, obtaining and determining; and calculating a first transformation between the first coordinate system and the second coordinate system based on the positions of the ultrasonic focal points in the first coordinate (Continued)

system and the second coordinate system to thereby calibrate a relationship between the ultrasonic haptic device and the visual sensor device.

19 Claims, 3 Drawing Sheets

(58) Field of Classification Search
CPC ....... G01S 15/32; G01S 15/08; G06V 40/107; G06T 2207/30196; G06T 7/20; G06T 7/70; G06T 2207/10028
See application file for complete search history.

(56) References Cited

U.S. PATENT DOCUMENTS

| | | | | |
|---|---|---|---|---|
| 9,612,658 | B2* | 4/2017 | Subramanian | G06F 3/016 |
| 10,489,531 | B2* | 11/2019 | Holz | G06F 3/017 |
| 10,691,219 | B2* | 6/2020 | Holz | G06F 3/0304 |
| 10,818,162 | B2* | 10/2020 | Carter | G10K 11/32 |
| 10,877,559 | B2* | 12/2020 | Doran | G06F 3/04883 |
| 10,921,890 | B2* | 2/2021 | Subramanian | G01C 21/3652 |
| 11,048,329 | B1* | 6/2021 | Lee | G06F 3/011 |
| 11,543,507 | B2* | 1/2023 | Carter | G06F 3/016 |
| 11,550,395 | B2* | 1/2023 | Beattie | G06N 20/00 |
| 2003/0208296 | A1* | 11/2003 | Brisson | A61B 90/10 |
| | | | | 700/117 |
| 2009/0287450 | A1* | 11/2009 | Dubois | G01B 11/2518 |
| | | | | 702/152 |
| 2009/0292201 | A1* | 11/2009 | Kruecker | A61B 34/20 |
| | | | | 600/426 |
| 2010/0150404 | A1* | 6/2010 | Marks | A63F 13/211 |
| | | | | 348/136 |
| 2011/0032184 | A1* | 2/2011 | Roche | G06F 3/011 |
| | | | | 345/156 |
| 2012/0223882 | A1* | 9/2012 | Galor | G06F 3/011 |
| | | | | 345/157 |
| 2013/0265241 | A1* | 10/2013 | Thorn | G06F 3/015 |
| | | | | 345/173 |
| 2013/0278635 | A1* | 10/2013 | Maggiore | G06F 3/0304 |
| | | | | 345/633 |
| 2015/0097768 | A1* | 4/2015 | Holz | G06F 3/0425 |
| | | | | 348/47 |
| 2015/0316985 | A1* | 11/2015 | Levesque | G06F 3/016 |
| | | | | 345/156 |
| 2017/0123499 | A1* | 5/2017 | Eid | G06F 3/017 |
| 2017/0193768 | A1* | 7/2017 | Long | G08B 6/00 |
| 2018/0267156 | A1* | 9/2018 | Carter | G06F 3/016 |
| 2018/0374264 | A1* | 12/2018 | Gatson | G01S 15/87 |
| 2019/0196578 | A1* | 6/2019 | Lodice | G01S 15/66 |
| 2019/0392238 | A1* | 12/2019 | Holz | G06V 10/147 |
| 2021/0012165 | A1* | 1/2021 | Jiang | G06F 18/214 |

OTHER PUBLICATIONS

Abe Davis et al.; The Visual Microphone: Passive Recovery of Sound from Video; ACM Journals; ACM Transactions on Graphics, vol. 33, No. 4, Jul. 2014, consisting of 10-pages.

Tom Carter et al.; UltraHaptics: Multi-Point Mid-Air Haptic Feedback for Touch Surfaces; UIST '13:Proceedings of the 26th annual ACM symposium on User interface software and technology, Oct. 2013, consisting of 10-pages.

* cited by examiner

Fig. 6

DETERMINING A TRANSFORMATION BETWEEN COORDINATE SYSTEMS IN AN ULTRASONIC HAPTIC DEVICE AND A VISUAL SENSOR DEVICE

CROSS-REFERENCE TO RELATED APPLICATIONS

This application is a Submission Under 35 U.S.C. § 371 for U.S. National Stage Patent Application of International Application Number: PCT/EP2019/057596, filed Mar. 26, 2019 entitled "DETERMINING A TRANSFORMATION BETWEEN COORDINATE SYSTEMS IN AN ULTRASONIC HAPTIC DEVICE AND A VISUAL SENSOR DEVICE," the entirety of which is incorporated herein by reference.

TECHNICAL FIELD

The present disclosure relates to a method for determining a transformation between a first coordinate system of an ultrasonic haptic device and a second coordinate system of a visual sensor device, a transformation determiner for determining a transformation between a first coordinate system of an ultrasonic haptic device and a second coordinate system of a visual sensor device, a corresponding computer program, and a corresponding computer program product.

BACKGROUND

A haptic device is a human machine interface which enables a way of interaction other than visual and sound, creating a sense of touch through different technologies. A sense of touch could for instance be created through vibrations or force feedback.

Traditionally, haptic devices have been utilized in tactile displays, gaming and simulators. However as virtual reality (VR) and mixed reality (MR) (encompassing augmented reality, AR, and augmented virtuality, AV) devices are rapidly growing, haptic devices are becoming an integral part of such systems to close the interaction loop. In VR and MR systems, haptic devices take the role of providing touch feedback for virtual content. An immersive VR or MR system could not be realized without effective and precise haptic feedbacks.

Haptic perception consists of kinaesthetic and tactile sense and relates to the sensation of the size, shape, mass, texture and stiffness of physical objects, surfaces, etc. Kinaesthetic information refers to the information perceived when moving joints, muscles and tendons, while tactile information refers to information retrieved via the skin. For example, haptic devices can create vibrations through direct contact to the user's skin (e.g. Avatar VR); they could use motors to steer the movement of a tool which is held by the user (e.g. Geomagic Touch) or they could create mid-air haptic sensations (e.g. Ultrahaptics, MyVox) which is part of the environment in which embodiments presented herein can be applied.

The mid-air haptic technologies provide users with the freedom of not having to wear or hold anything, therefore being easier to use and enhancing user experience.

Mid-air haptic technologies could be applied to a vast spectrum of industries including automotive, healthcare, marketing and advertisement, gaming and more. They can be used as feedback reinforcement of graphical user interfaces such as buttons, slide bars and pull-down menus. For instance, by embedding a mid-air haptic device into the infotainment system of a car, it is possible to interact with the system in mid-air, without the driver needing to take eyes from the road.

Another example would be publicly available machines such as cash machines, elevators vending machines. Mid-air feedback would provide a cleaner and more hygienic interaction while reducing the needed maintenance of the machine.

Mid-air haptic devices mainly use ultrasound to create tactile sensations. These ultrasonic haptic devices utilize an array of ultrasonic transducers to create ultrasonic waves which coincide at a point in the space, an ultrasonic focal point. An ultrasonic focal point that is moved in space or changed in intensity could create a tactile sensation on the hand of the user. In order to track and determine the position of the hand in space to be able to project a focal point on it, hand tracking systems are used, such as those provided by the company Leap Motion.

Precise hand tracking is used to ensure that the user feels the tactile sensation in the right location. The hand tracking device derives the position of the user hand and its elements and this information is then used to define where the actuation should take place (the ultrasonic focal point used for the haptic actuation). The hand tracking also needs to be accurate in order to provide a higher resolution tactile actuation in specific point(s) of the user hand that are in "contact" with the (virtual) object to be rendered.

In experiments, the inventors have discovered that the tactile feedback is not sufficiently precise. The deviation between ultrasonic focal point and the point tracked by the hand tracking sensor could be significant, e.g. one centimetre or more, which drastically affects the user experience.

SUMMARY

One objective is to improve calibration between a first coordinate system of an ultrasonic haptic device and a second coordinate system of a visual sensor device.

According to a first aspect, it is provided a method for determining a transformation between a first coordinate system of an ultrasonic haptic device and a second coordinate system of a visual sensor device. The method is performed in a transformation determiner and comprises the steps of: triggering generation of an ultrasonic focal point by the ultrasonic haptic device, the position of the ultrasonic focal point being defined in the first coordinate system; obtaining images captured by the visual sensor device, the images depicting a body part of a user while the ultrasonic focal point is active; determining, based on the images, a position of the ultrasonic focal point in the second coordinate system when the body part of the user is, within a margin of error, in the ultrasonic focal point; repeating the steps of triggering, obtaining and determining for at least three additional ultrasonic focal points, wherein each ultrasonic focal point is in a different location compared to the other ultrasonic focal points; and calculating a first transformation between the first coordinate system and the second coordinate system based on the positions of the ultrasonic focal points in the first coordinate system and the second coordinate system to thereby calibrate a relationship between the ultrasonic haptic device and the visual sensor device.

The step of determining a position of the ultrasonic focal point may be based on a body part tracker.

The body part tracker may form part of the visual sensor device.

The step of determining a position of the ultrasonic focal point may be based on depth information forming part of the images.

The method may further comprise the step of: instructing the user to find the ultrasonic focal point with the body part.

The step of instructing the user may comprise triggering three-dimensional rendering of a region encompassing the ultrasonic focal point.

The step of determining the position of the ultrasonic focal point may comprise detecting a skin vibration on the body part.

The first transformation may be in the form of a transformation matrix.

The body part may be a hand.

The method may further comprise a step of applying calibration, wherein the calibration is based on the transformation calculated in the step of calculating a first transformation.

According to a second aspect, it is provided a transformation determiner for determining a transformation between a first coordinate system of an ultrasonic haptic device and a second coordinate system of a visual sensor device. The transformation determiner comprises: a processor; and a memory storing instructions that, when executed by the processor, cause the transformation determiner to: trigger generation of an ultrasonic focal point by the ultrasonic haptic device, the position of the ultrasonic focal point being defined in the first coordinate system; obtain images captured by the visual sensor device, the images depicting a body part of a user while the ultrasonic focal point is active; determine, based on the images, a position of the ultrasonic focal point in the second coordinate system when the body part of the user is, within a margin of error, in the ultrasonic focal point; repeat the instructions to trigger, obtain and determine for at least three additional ultrasonic focal points, wherein each ultrasonic focal point is in a different location compared to the other ultrasonic focal points; and calculate a first transformation between the first coordinate system and the second coordinate system based on the positions of the ultrasonic focal points in the first coordinate system and the second coordinate system to thereby calibrate a relationship between the ultrasonic haptic device and the visual sensor device.

The instructions to determine a position of the ultrasonic focal point may be based on data from a body part tracker.

The body part tracker may form part of the visual sensor device.

The instructions to determine a position of the ultrasonic focal point may be based on depth information forming part of the images.

The transformation determiner may further comprise instructions that, when executed by the processor, cause the transformation determiner to instruct the user to find the ultrasonic focal point with the body part.

The instructions to instruct the user may comprise instructions that, when executed by the processor, cause the transformation determiner to trigger three-dimensional rendering of a region encompassing the ultrasonic focal point.

The instructions to determine the position of the ultrasonic focal point may comprise instructions that, when executed by the processor, cause the transformation determiner to detect a skin vibration on the body part.

The first transformation may be in the form of a transformation matrix.

The body part may be a hand.

The transformation determiner may further comprise instructions that, when executed by the processor, cause the transformation determiner to apply calibration, wherein the calibration is based on the transformation calculated in the instructions to calculate a first transformation.

According to a third aspect, it is provided a computer program for determining a transformation between a first coordinate system of an ultrasonic haptic device and a second coordinate system of a visual sensor device. The computer program comprises computer program code which, when run on a transformation determiner causes the transformation determiner to: trigger generation of an ultrasonic focal point by the ultrasonic haptic device, the position of the ultrasonic focal point being defined in the first coordinate system; obtain images captured by the visual sensor device, the images depicting a body part of a user while the ultrasonic focal point is active; determine, based on the images, a position of the ultrasonic focal point in the second coordinate system when the body part of the user is, within a margin of error, in the ultrasonic focal point; repeat the instructions to trigger, obtain and determine for at least three additional ultrasonic focal points, wherein each ultrasonic focal point is in a different location compared to the other ultrasonic focal points; and calculate a first transformation between the first coordinate system and the second coordinate system based on the positions of the ultrasonic focal points in the first coordinate system and the second coordinate system to thereby calibrate a relationship between the ultrasonic haptic device and the visual sensor device.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

In embodiments presented herein, a solution is provided which allows calibration of an ultrasonic haptic device and a visual sensor device. The solution allows determination of the pose of the hand of the user in the coordinate system of the ultrasonic haptic device. In this way, the actuation by the ultrasonic haptic device can be provided in the correct location of the hand of the user. As ultrasonic waves hit the skin of a hand, they create vibrations on the skin. Images of the hand are used to locate the vibrations of the ultrasonic haptic feedback on the hand of the user and an estimation of the position of the ultrasonic focal point in the coordinate system of the visual sensor device is performed. Then, the position of the ultrasonic focal point in the ultrasonic haptic device coordinate system is set as a known position. After repeating this a number of times, the positions of the ultrasonic focal point in both coordinate systems are used to calculate the transformation between the two coordinate systems, as explained in more detail below.

In the prior art, there is no way to automatically find the transformation between the coordinate systems of the ultrasonic haptic device and the body part tracking sensor (e.g. hand tracking sensor). In the case of Ultrahaptics device, the transformation between the transducers board and the body part tracking sensor was computed once when the device was manufactured and is hardcoded in the device SDK (Software Development Kit), which can be applied since the body part tracking sensor is fixed and cannot be moved. However, this prevents other body part tracking sensors to be used with the Ultrahaptics device, and the provided tracking sensor cannot be repositioned for improved tracking.

Figure 1:
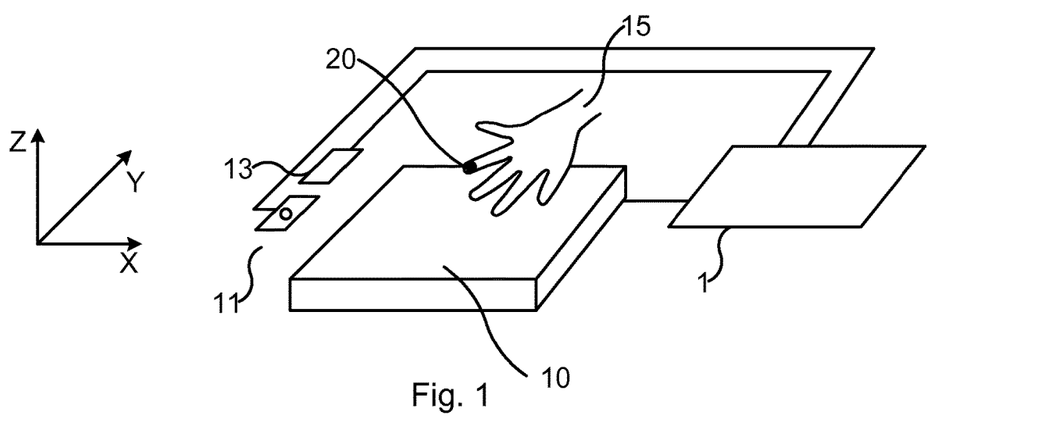
FIG. 1 is a schematic diagram illustrating an environment in which embodiments presented herein can be applied.

FIG. 1 is a schematic diagram illustrating an environment in which embodiments presented herein can be applied. An ultrasonic haptic device 10 is used to provide haptic feedback via an array of ultrasonic transducers to the user (e.g. Ultrahaptics). The ultrasonic waves created by the transducers are controlled to coincide at a point in the space, at an ultrasonic focal point 20. The ultrasonic focal point 20 can be moved in space or changed in intensity to control a tactile sensation on a body part 15 of the user. In the examples presented herein, the body part 15 exemplified as a hand. However, it is to be noted that the embodiments presented herein are not restricted to the body part being a hand; any suitable body part of the user can be used. In order to track and determine the position of the hand 15 in space, to be able to project an ultrasonic focal point on it, a body part (in this example hand) tracking system 13 is provided, e.g. from Leap Motion. The body part tracker 13 can be a sensor which tracks a body part (e.g. the hand) of the user, e.g. using an RGB (Red Green Blue) visual sensor, a depth camera, etc.

A visual sensor device ii comprises a visual sensor which is able to capture images. Hence, the visual sensor device ii comprises a camera. Optionally, the visual sensor device 11 can be combined with the body part tracker 13 in a single physical device. The visual sensor device 11 can be placed next to the ultrasonic haptic device 10, facing the active region of the ultrasonic haptic device 10. The visual sensor device 11, either alone or in combination with the body part tracker 13, can be used to determine depth, e.g. distance, to the skin of a tracked hand.

A transformation determiner 1 is provided to calibrate the conversion between the coordinate systems of the visual sensor device ii and the ultrasonic haptic device 10, as explained in more detail below.

Figure 2A:
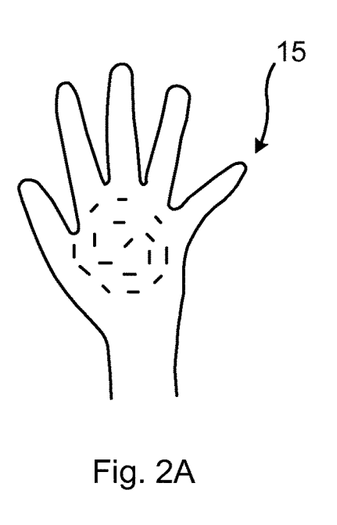
FIGS. 2A-C are schematic diagrams illustrating the effect of an ultrasonic focal point on a body part.
Figure 2B:
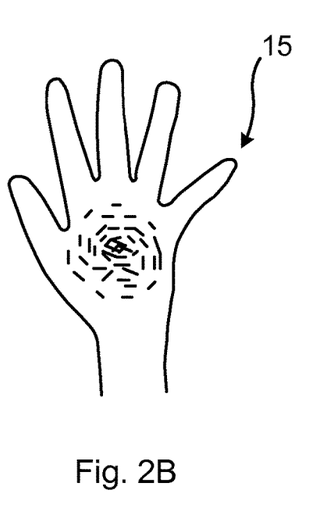
Figure 2C:
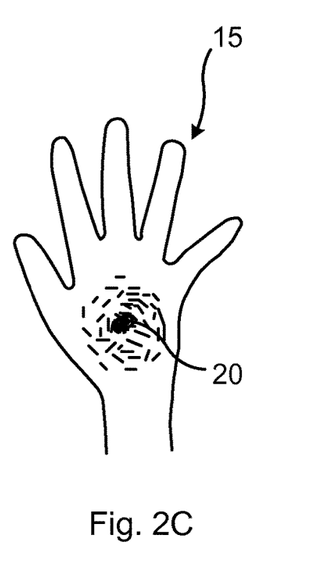

FIGS. 2A-C are schematic diagrams illustrating the effect of an ultrasonic focal point on a body part 15, in this case a hand. Each marking on the hand, in the form of a small line, indicates a small vibration on the skin. In FIG. 2A, vibrations of the skin of the hand are shown when the hand approaches, but is not yet at, the ultrasonic focal point. In FIG. 2B, the hand is closer to the ultrasonic focal point, increasing the intensity of the vibrations, but not yet to a maximum. In FIG. 2C, the skin of the hand is in the ultrasonic focal point 20 vibrations are at its maximum.

A sequence of images (e.g. as a video stream) is captured of the hand 15 as it moves through an ultrasonic focal point. When the vibrations are at a maximum, the position of the ultrasonic focal point 20 of that frame can reliably be determined. In this frame, the amplitude of the vibrations is at its maximum and the vibrations are most focused, i.e. in the smallest region. As long as the user moves the hand through the ultrasonic focal point at reasonable speed, this will result in capturing the frame containing the ultrasonic focal point.

The margin of error of this determination depends on the frame rate of the video capture and how focused the ultrasonic focal point 20 is.

Figure 3A:
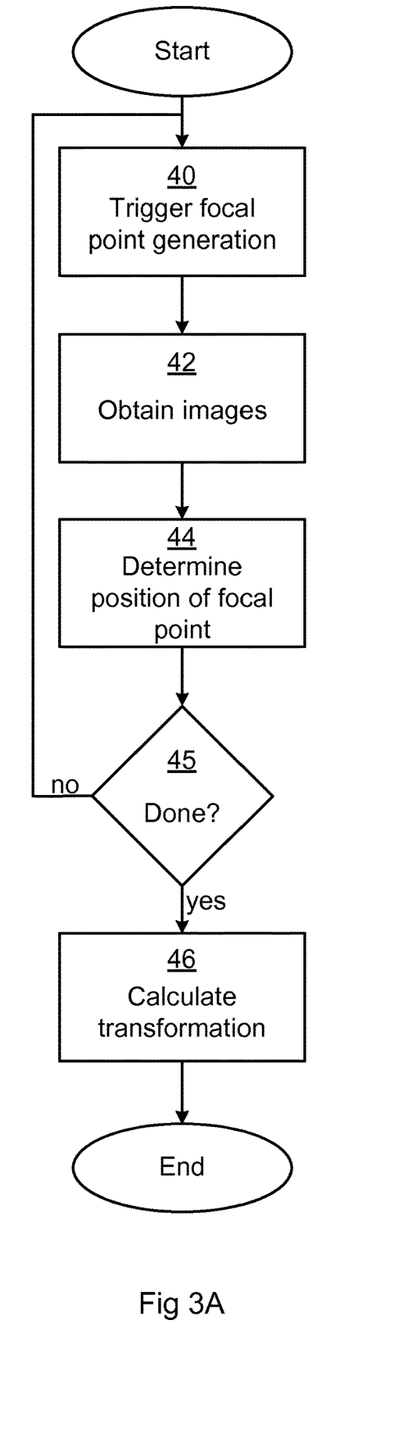
FIGS. 3A-B are flow charts illustrating embodiments of methods for determining a transformation between a first coordinate system of an ultrasonic haptic device and a second coordinate system of a visual sensor device.
Figure 3B:
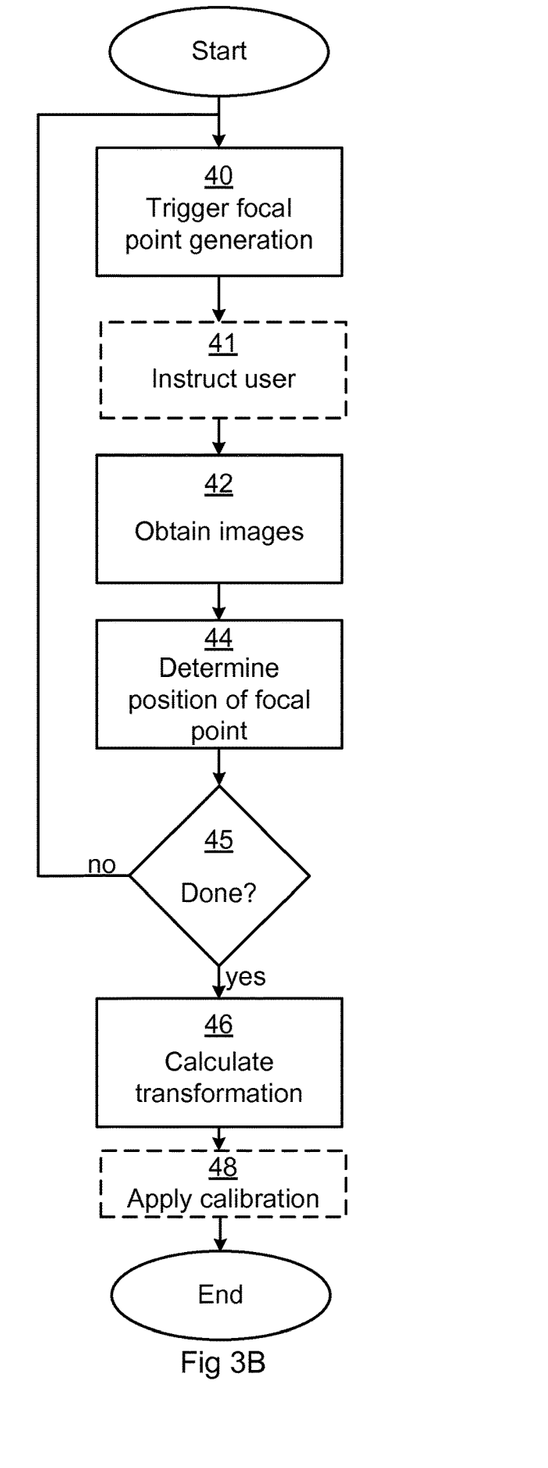

FIGS. 3A-B are flow charts illustrating embodiments of methods for determining a transformation between a first coordinate system of an ultrasonic haptic device and a second coordinate system of a visual sensor device. The method is performed in the transformation determiner.

In a trigger focal point generation step 40, the transformation determiner triggers generation of an ultrasonic focal point by the ultrasonic haptic device. The position of the ultrasonic focal point is defined in the first coordinate system, i.e. the coordinate system of the ultrasonic haptic device.

This step can make use of an API (Application Programming Interface) provided by the manufacturer of the ultrasonic haptic device. The ultrasonic haptic device then renders an ultrasonic focal point P_uhd in the first coordinate system where P_uhd is a point in three dimensions X, Y, Z. See FIG. 1, where X and Y axes are extended along the edges of the ultrasonic haptic device and the Z axis is perpendicular to the XY plane.

In one embodiment, points are selected to be on top of the centre and corners of the device and at different heights.

In an obtain images step 42, the transformation determiner obtains images, captured by the visual sensor device. The images depict a body part of the user while the ultrasonic focal point is active. The images can be in the form of a set of sequential images, e.g. a video stream at a specific frame rate. The body part can be a hand, which is convenient for the user to move as requested. However, there is nothing preventing the body part to be any other suitable body part, such as arm, elbow, foot, leg, etc.

In a determine position of focal point step 44, the transformation determiner determines, based on the images, a position of the ultrasonic focal point in the second coordinate system, i.e. the coordinate system of the visual sensor device. This is performed when the body part of the user is, within a margin of error, in the ultrasonic focal point.

Ultrasonic focal points create air pressure, hence vibrations on the skin, changing the composition of the skin. The changes in the skin surface are thus captured in the images taken by the visual sensor device. The images are used to detect the vibrations, and optionally their amplitude and frequency. Optionally, interpolation between images is used to improve the resolution of this determination.

In one embodiment, the vibration frequency response of different parts of the skin of the hand is estimated. Projection of the ultrasonic focal point on the skin of the hand creates a certain range of vibration frequency response. For instance, the vibration frequency response of the centre of the palm is different from the vibration frequency response of a fingertip when an ultrasonic focal point is projected on these different parts of the hand. This range of frequency responses could be measured in advance and a model corresponding to the correct frequency response given an ultrasonic focal point in a hand of the user can be built.

Furthermore, the frequency response on an ultrasonic focal point is not the same as the frequency response when you have multiple dispersed points of impact (i.e. when the body part is not in the ultrasonic focal point). The reason for this is that multiple actuators (of the ultrasonic haptic device 10) all impact the ultrasonic focal point in a very small region and in an overlapping manner. Similarly, since a lot of actuations are performed in the same area, the amplitude resulting from these actuations is larger. This is also something that can be measured in the sequence of images.

For every captured frame, an estimated vibration frequency response of different parts of the hand is compared to the vibration frequency response range of the ultrasonic focal point. For instance, if the centre of the palm is exposed to the ultrasonic waves, as the hand gets closer to the ultrasonic focal point (see FIGS. 2A-C), the frequency response of the centre of the palm gets closer to the frequency response range of centre of the palm to an ultrasonic focal point. According to this embodiment, the frame in which an estimated vibration frequency response falls into ultrasonic focal point frequency response range is the frame that accommodates the ultrasonic focal point.

It is to be noted that the detected ultrasonic focal point on the skin is not an exact point in space, but a region which depends on the resolution of the ultrasonic haptic device. At present, this region may be an area of a few square millimetres to a few square centimetres. For example, for the Ultrahaptics device, this region is of about one square centimetre. The centroid of this shape is considered to be the position of the ultrasonic focal point.

After detecting the frame which contains the highest intensity of the ultrasonic waves, the position of the ultrasonic focal point is obtained in the second coordinate system. To obtain this position, P_vs, depth information is used.

The depth information can be provided by a depth sensor (e.g. Intel Realsense D435) which contains a depth camera and a single RGB camera. The RGB image information can be used to detect the vibration point in the palm (2D point), and then the depth camera is used to track the palm and the corresponding 2D point in the 3D coordinate system of the camera (P_vs).

The position of the ultrasonic focal point can be determined based on a body part tracker. The body part tracker can form part of the visual sensor device or be separate devices. In any case, in this embodiment, the geometric relationship between the visual sensor device and the body part tracker is known, either by fixed colocation or fixed geometric relationship, or through a deduced transformation, e.g. as explained in more detail below.

The position of the ultrasonic focal point can be determined based on depth information forming part of the images.

The position of the ultrasonic focal point can be determined based on detecting a skin vibration on the body part, as illustrated in FIGS. 2A-C and described above.

In one embodiment, the body part tracking information could be computed from images using deep neural networks as known in the art per se, see e.g. Zimmerman et al: "Learning to Estimate 3D Hand Pose from Single RGB Images", University of Freiburg, available at https://arxiv.org/pdf/1705.01389.pdf at the time filing this patent application. The position of the ultrasonic focal point projected on the hand of the user is calculated for the frame (i.e. image) mentioned above, in which the ultrasonic focal point is identified. This position, P_vs, is the position of the ultrasonic focal point in the second coordinate system.

In one embodiment, the visual sensor device forms part of the same device as the body part tracking sensor. In this case, the transformation between the visual sensor device and the body part tracking sensor is known (e.g. provided by the manufacturer). The position of the ultrasonic focal point in the second coordinate system could be retrieved from the body part tracking sensor.

In one embodiment, the body part tracking sensor is not integrated in the visual sensor device. The body part tracking sensor and the visual sensor device could then be calibrated separately, as described below.

In a conditional done step 45, the transformation determiner determines when the ultrasonic focal point positioning is done, i.e. whether a sufficient number of ultrasonic focal points have been positioned. At least four points are needed in total for a three-dimensional coordinate system transformation. However, the method can use more points to improve accuracy and reduce effect of noisy measurements and/or outliers. When the ultrasonic focal point positioning is done, the method proceeds to a calculate transformation step 46. Otherwise, the method returns to the trigger focal point generation step 40. For each iteration of step 40, each ultrasonic focal point is in a different location compared to the other (previously generated) ultrasonic focal points.

In the calculate transformation step 46, the transformation determiner calculates a first transformation between the first coordinate system and the second coordinate system. This calculation is based on the positions of the ultrasonic focal points in the first coordinate system and the second coordinate system. In this way, a relationship between the ultrasonic focal point and the visual sensor device is calibrated. The first transformation can e.g. be in the form of a transformation matrix. Alternatively, the first transformation can be in the form of a set of equations or any other suitable form.

In order to be able to calculate the transformation between the ultrasonic haptic device and the visual sensor device, as explained above, at least four linearly independent points in the first coordinate system (P_uhd) and their corresponding points in the second coordinate system (P_vs) are used. When more than four sets of points are available, outlier rejection methods such as RANSAC can be applied and/or a least squares methods can be applied for computing the best transform (in the linear square sense), given the set of measurements.

For instance, the transformation matrix T_uhd_vs applied in the following equation (1) can be calculated:

$$P\_uhd = T\_uhd\_vs \cdot P\_vs \qquad (1)$$

Looking now to FIG. 3B, only new or modified steps compared to the steps of FIG. 3A will be described.

In an optional instruct user step 41, the transformation determiner instructs the user to find the ultrasonic focal point with the body part. In one embodiment, this comprises triggering three-dimensional rendering of a region encompassing the ultrasonic focal point. The three-dimensional rendering can be achieved e.g. using mixed reality or VR (Virtual Reality) hardware. The guidance can also be performed using auditory and/or two-dimensional graphical user interface, e.g. on a computer and/or smartphone.

In other words, the user is guided to move the hand (or other body part) in the area above the ultrasonic haptic device to thereby locate the ultrasonic focal point.

It is indicated to the user to place an open hand above the ultrasonic haptic device in parallel to the transducers array in the whereabouts of the point P_uhd in the first coordinate system.

The user can choose which part of the hand is going to be exposed to the ultrasound. It could be the distal phalange (the last joint of a finger) of the index or long finger, palm or back of the hand.

In one embodiment, it is indicated to the user to move the hand up along the Z axis where the ultrasonic focal point is projected, such that the user feels the ultrasonic pressure on the hand strengthen when approaching the ultrasonic focal point, after which it weakens. Then the user lowers the hand along the Z axis. For instance, if the ultrasonic focal point is created 15 centimetres above the top left corner of the device, the user begins by placing the hand on the top left corner. The user gradually raises the hand to around 25 centimetres above the starting point and then starts to lower it on the same path until the hand reaches the device. At this point ultrasonic haptic device stops projecting and visual sensor device stops capturing images.

In one embodiment, it is indicated to the user to move the hand until the user finds the area in which the ultrasonic focal point feels more intense. It is indicated to the user to keep moving the hand within this area, in a virtual sphere of a few cubical centimetres. After a few seconds of the hand hovering in the sphere around the ultrasonic focal point, the ultrasonic haptic device stops projecting and visual sensor device stops capturing images and the position of ultrasonic focal point can be determined.

In one embodiment the user has access to an AR device, which visualizes the position of the point in the ultrasonic haptic device workspace. The AR device also visualizes the virtual region around the ultrasonic focal point in which the hand should be moved. After a few seconds of the hand hovering around the ultrasonic focal point, the ultrasonic haptic device stops projecting and the visual sensor device stops capturing images.

In an optional apply calibration step 48, the calibration based on the transformation calculated in the calculate transformation step 46 is applied. In this way, the calibration is applied for whenever the first coordinate system of the ultrasonic haptic device and the second coordinate system of the visual sensor device need are used together, e.g. for tracking the body part to ensure that the user feels the tactile sensation in the right location.

When the ultrasonic haptic device is equipped with a body part tracking sensor, the body part tracking sensor for the ultrasonic haptic device can be calibrated according to the following.

The body part tracking sensor and the visual sensor device are configured to have similar optical characteristics such as sampling frequency, scale and focus. Steps 40 and 41 from above are performed. Also, step 42 is performed, but here the body part tracking sensor also captures images of the hand together with the visual sensor device. At this point, the frame containing most intense ultrasonic focal point has been detected and the position of the ultrasonic focal point in the second coordinate system (P_vs) is acquired.

The body part tracking sensor information is obtained that corresponds to the detected frame of the visual sensor device, thus acquiring the position of the ultrasonic focal point in the first coordinate system, P_hts.

The mentioned steps are then repeated for at least four points.

In a way similar to step 46 mentioned above, a transformation matrix T_hts_vs is then calculated between the coordinate systems of the body part tracking sensor and the second coordinate system. This computation is based on both the body part sensor and the visual sensor device capturing the same corresponding points in a synchronized manner, after which a transformation can be computed from these corresponding points in both coordinate systems according to the following.

The calculated transformation T_hts_vs could be used to directly map a point in the first coordinate system to the body part tracking sensor coordinate system when a user is using the calibrated ultrasonic haptic device, according to the following:

$$P\_uhd = T\_uhd\_vs \cdot P\_vs \qquad (2)$$
$$P\_vs = T\_vs\_hts \cdot P\_hts \qquad (3)$$

From (2) and (3), equation (4) is derived:

$$P\_uhd = T\_uhd\_vs \cdot T\_vs\_hts \cdot P\_hts \qquad (4)$$

According to embodiments presented herein, an automatic calibration between the coordinate systems of the visual sensor device and the ultrasonic haptic device is achieved. The presented solution does not rely on hardcoding of such a transformation. Hence, freedom of placing the visual sensor device at any desirable location around the ultrasonic haptic device is provided, after which a new transformation and calibration, applicable for the present location of the visual sensor device, can be executed.

No additional hardware is needed than what is used in a regular setup. All that is needed is the integral component of the system (ultrasonic haptic device and visual sensor device), the hand (or other body part of the user) of the user and the transformation determiner.

Figure 4:
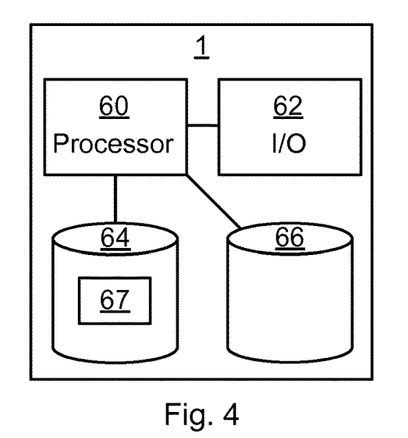
FIG. 4 is a schematic diagram illustrating components of the transformation determiner of FIG. 1 according to one embodiment.

FIG. 4 is a schematic diagram illustrating components of the transformation determiner 1 of FIG. 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 3A and 3B above.

The memory 64 can be any combination of random-access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The transformation determiner 1 further comprises an I/O interface 62 for communicating with external and/or internal entities. Optionally, the I/O interface 62 also includes a user interface.

Other components of the transformation determiner 1 are omitted in order not to obscure the concepts presented herein.

Figure 5:
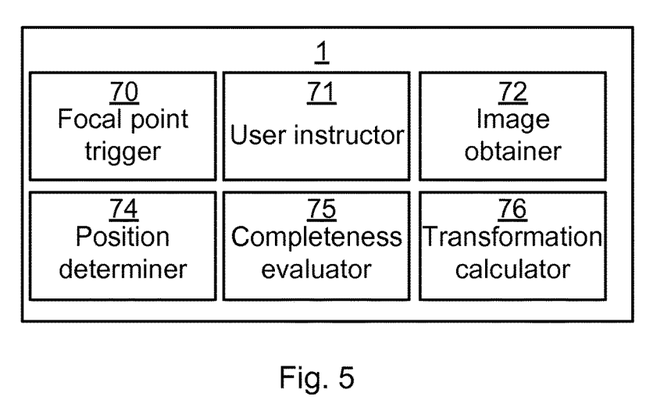
FIG. 5 is a schematic diagram showing functional modules of the transformation determiner of FIG. 1 according to one embodiment.

FIG. 5 is a schematic diagram showing functional modules of the transformation determiner 1 of FIG. 1 according to one embodiment. The modules are implemented using software instructions such as a computer program executing in the transformation determiner 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A and 3B.

A focal point trigger 70 corresponds to step 40. A user instructor 71 corresponds to step 41. An image obtainer 72 corresponds to step 42. A position determiner 74 corresponds to step 44. A completeness evaluator 75 corresponds to step 45. A transformation calculator 76 corresponds to step 46.

Figure 6:
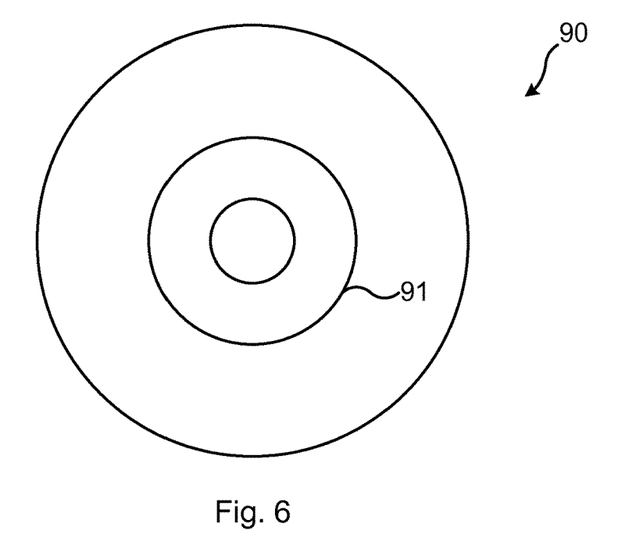
FIG. 6 shows one example of a computer program product comprising computer readable means.

FIG. 6 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for determining a transformation between a first coordinate system of an ultrasonic haptic device and a second coordinate system of a visual sensor device, the method being performed in a transformation determiner, the method comprising:
   triggering generation of an ultrasonic focal point by the ultrasonic haptic device, the position of the ultrasonic focal point being defined in the first coordinate system;
   obtaining images captured by the visual sensor device, the images depicting a body part of a user while the ultrasonic focal point is active;
   determining, based on the images, a position of the ultrasonic focal point in the second coordinate system when the body part of the user is, within a margin of error, in the ultrasonic focal point, determining the position of the ultrasonic focal point including detecting a skin vibration on the body part;
   repeating the triggering, obtaining and determining for at least three additional ultrasonic focal points, each ultrasonic focal point being in a different location compared to the other ultrasonic focal points; and
   calculating a first transformation between the first coordinate system and the second coordinate system based on the positions of the ultrasonic focal points in the first coordinate system and the second coordinate system to thereby calibrate a relationship between the ultrasonic haptic device and the visual sensor device.

2. The method according to claim 1, wherein the determining a position of the ultrasonic focal point is based on a body part tracker.

3. The method according to claim 2, wherein the body part tracker forms part of the visual sensor device.

4. The method according to claim 1, wherein the determining a position of the ultrasonic focal point is based on depth information forming part of the images.

5. The method according to claim 1, further comprising:
   instructing the user to find the ultrasonic focal point with the body part.

6. The method according to claim 5, wherein the instructing the user comprises triggering three-dimensional rendering of a region encompassing the ultrasonic focal point.

7. The method according to claim 1, wherein the first transformation is in the form of a transformation matrix.

8. The method according to claim 1, wherein the body part is a hand.

9. The method according to claim 1, further comprising applying calibration, wherein the calibration is based on the transformation calculated in the step of calculating a first transformation.

10. A transformation determiner for determining a transformation between a first coordinate system of an ultrasonic haptic device and a second coordinate system of a visual sensor device, the transformation determiner comprising:
    a processor; and
    a memory storing instructions that, when executed by the processor, cause the transformation determiner to:
      trigger generation of an ultrasonic focal point by the ultrasonic haptic device, the position of the ultrasonic focal point being defined in the first coordinate system;
      obtain images captured by the visual sensor device, the images depicting a body part of a user while the ultrasonic focal point is active;
      determine, based on the images, a position of the ultrasonic focal point in the second coordinate system when the body part of the user is, within a margin of error, in the ultrasonic focal point, the determining the position of the ultrasonic focal point including detecting a skin vibration on the body part;

repeat the instructions to trigger, obtain and determine for at least three additional ultrasonic focal points, each ultrasonic focal point being in a different location compared to the other ultrasonic focal points; and calculate a first transformation between the first coordinate system and the second coordinate system based on the positions of the ultrasonic focal points in the first coordinate system and the second coordinate system to thereby calibrate a relationship between the ultrasonic haptic device and the visual sensor device.

11. The transformation determiner according to claim 10, wherein the instructions to determine a position of the ultrasonic focal point is based on data from a body part tracker.

12. The transformation determiner according to claim 11, wherein the body part tracker forms part of the visual sensor device.

13. The transformation determiner according to claim 10, wherein the instructions to determine a position of the ultrasonic focal point are based on depth information forming part of the images.

14. The transformation determiner according to claim 10, further comprising instructions that, when executed by the processor, cause the transformation determiner to instruct the user to find the ultrasonic focal point with the body part.

15. The transformation determiner according to claim 14, wherein the instructions to instruct the user comprise instructions that, when executed by the processor, cause the transformation determiner to trigger three-dimensional rendering of a region encompassing the ultrasonic focal point.

16. The transformation determiner according to claim 10, wherein the first transformation is in the form of a transformation matrix.

17. The transformation determiner according to claim 10, wherein the body part is a hand.

18. The transformation determiner according to claim 10, further comprising instructions that, when executed by the processor, cause the transformation determiner to apply calibration, wherein the calibration is based on the transformation calculated in the instructions to calculate a first transformation.

19. A computer storage medium storing a computer program for determining a transformation between a first coordinate system of an ultrasonic haptic device and a second coordinate system of a visual sensor device, the computer program comprising computer program code which, when run on a transformation determiner causes the transformation determiner to:

trigger generation of an ultrasonic focal point by the ultrasonic haptic device, the position of the ultrasonic focal point being defined in the first coordinate system;

obtain images captured by the visual sensor device, the images depicting a body part of a user while the ultrasonic focal point is active;

determine, based on the images, a position of the ultrasonic focal point in the second coordinate system when the body part of the user is, within a margin of error, in the ultrasonic focal point, the determining the position of the ultrasonic focal point including detecting a skin vibration on the body part;

repeat the instructions to trigger, obtain and determine for at least three additional ultrasonic focal points, each ultrasonic focal point being in a different location compared to the other ultrasonic focal points; and calculate a first transformation between the first coordinate system and the second coordinate system based on the positions of the ultrasonic focal points in the first coordinate system and the second coordinate system to thereby calibrate a relationship between the ultrasonic haptic device and the visual sensor device.

* * * * *

UNITED STATES PATENT AND TRADEMARK OFFICE
CERTIFICATE OF CORRECTION

| | |
|---|---|
| PATENT NO. | : 11,893,155 B2 |
| APPLICATION NO. | : 17/442388 |
| DATED | : February 6, 2024 |
| INVENTOR(S) | : Araújo et al. |

It is certified that error appears in the above-identified patent and that said Letters Patent is hereby corrected as shown below:

In the Specification

In Column 5, Line 50, delete "exemplified" and insert -- is exemplified --, therefor.

In Column 5, Line 61, delete "device ii" and insert -- device 11 --, therefor.

In Column 5, Line 62, delete "device ii" and insert -- device 11 --, therefor.

In Column 6, Line 6, delete "device ii" and insert -- device 11 --, therefor.

In Column 6, Line 18, delete "point 20" and insert -- point 20 and --, therefor.

Signed and Sealed this
Thirtieth Day of April, 2024

Katherine Kelly Vidal
*Director of the United States Patent and Trademark Office*